United States Patent
Lin et al.

(10) Patent No.: US 10,392,110 B2
(45) Date of Patent: Aug. 27, 2019

(54) SOLAR CELL MODULE FOR UNMANNED AERIAL VEHICLE

(71) Applicant: National Taiwan University, Taipei (TW)

(72) Inventors: Ching-Fuh Lin, Taipei (TW); Ta-Jung Lin, Taipei (TW)

(73) Assignee: National Taiwan University, Taipei (TW)

( * ) Notice: Subject to any disclaimer, the term of this patent is extended or adjusted under 35 U.S.C. 154(b) by 18 days.

(21) Appl. No.: 15/824,994

(22) Filed: Nov. 28, 2017

(65) Prior Publication Data

US 2018/0208308 A1 Jul. 26, 2018

(30) Foreign Application Priority Data

Jan. 24, 2017 (TW) ............................... 106102696 A

(51) Int. Cl.
*B64C 39/02* (2006.01)
*B64D 27/24* (2006.01)

(52) U.S. Cl.
CPC ............ *B64C 39/024* (2013.01); *B64D 27/24* (2013.01); *B64C 2201/042* (2013.01); *B64C 2201/108* (2013.01); *B64C 2201/146* (2013.01); *B64D 2211/00* (2013.01); *Y02T 50/55* (2018.05); *Y02T 50/62* (2013.01)

(58) Field of Classification Search
CPC ............ B64C 39/024; B64C 2201/042; B64C 2201/146; B64D 27/24; B64D 2211/00; Y02T 50/55; Y02T 50/62
USPC ............................................................ 701/3
See application file for complete search history.

(56) References Cited

U.S. PATENT DOCUMENTS

| 9,630,713 | B1 * | 4/2017 | Von Novak, III | ...... B64C 25/52 |
| 2016/0359330 | A1 * | 12/2016 | Jin | ............................. H02J 7/35 |
| 2017/0305564 | A1 * | 10/2017 | Pan | ......................... B60L 8/003 |

* cited by examiner

*Primary Examiner* — Gertrude Arthur Jeanglaude
(74) *Attorney, Agent, or Firm* — Donald E. Stout; Stout, Uxa & Buyan, LLP

(57) ABSTRACT

A solar cell module for an unmanned aerial vehicle is disclosed. The solar cell module includes a carrier base and a solar cell unit. The carrier base is disposed on the unmanned aerial vehicle. The solar cell unit has a plurality of solar cells attached to the carrier body. A ratio of the power provided by the solar cell unit to the weight of the solar cell module is equal to or greater than 0.1 (W/g).

21 Claims, 8 Drawing Sheets

SOLAR CELL MODULE FOR UNMANNED AERIAL VEHICLE

CROSS-REFERENCE TO RELATED APPLICATIONS

The entire contents of Taiwan Patent Application No. 106102696, filed on Jan. 24, 2017, from which this application claims priority, are expressly incorporated herein by reference.

BACKGROUND OF THE INVENTION

1. Field of the Invention

The present invention relates to a solar cell module, and more particularly, relates to a solar cell module used for an unmanned aerial vehicle.

2. Description of Related Art

An unmanned aerial vehicle (UAV), commonly known as a drone, is an aircraft without a human pilot aboard. It can be used for filming, product deliveries, surveillance, and other applications. Due to the popular applications, the development of unmanned aerial vehicle has drawn increasing attentions.

A conventional unmanned aerial vehicle is generally powered by a battery. However, the battery power is limited, resulting in limited time of the aerial flight of the unmanned aerial vehicle. The battery power is not sufficient, so does not allow the unmanned aerial vehicle for a photogrammetry and other applications with long-term flight.

Although solar cells have been adopted by some fixed-wing type of unmanned aerial vehicles as the power source, it typically needs a run way for taking off and landing. In a fixed-wing type of unmanned aerial vehicle, the propellers or engine provides motive power for advancing the aerial vehicle, and the buoyancy of the aerial vehicle is generated by the pressure difference between the top and the bottom of the wings during the horizontal movements of the aerial vehicle. Accordingly, the wings of the aerial vehicle are designed with large horizontal surface area allowing arrangement of solar cells. The horizontal solar cells are convenient to absorb sunlight with a normal incident angle to the wings. Therefore, putting up solar panels on the wings is pretty straight forward.

In a conventional fixed-wing type of unmanned aerial vehicle, the solar cells must be perpendicular to the propellers of the engine; otherwise the solar cells may interfere with the air flow of the engine. FIG. 1 is a perspective view showing a conventional fixed-wing type of unmanned aerial vehicle 10, which includes a body 12, wings 14, solar cells 16, and engines 18. The wings 14 are arranged at a left side and a right side of the body 12, respectively. The solar cells 16 and the engines 18 are arranged at the top and the bottom of the wings 14, respectively. Accordingly, the solar cells 16 are separated from the engines 18 by the wings 14, so that the solar cells 16 will not interfere with the air flow from the engine 18.

Although most UAVs are fixed-wing aircraft, rotorcraft designs are also used. A rotorcraft or rotary-wing aircraft is a heavier-than-air flying machine that uses lift generated by rotary-wings or rotor blades that revolve around a mast. The heavier-than-air unmanned aerial vehicles can push air or gas downwards so that a reaction occurs to push the aircraft upwards and therefore the aircrafts can take off and land vertically without the need of running ways. Wings for previous drones shown in FIG. 1 may be unnecessary for this type of aircrafts, and therefore it has no proper place to arrange solar cells. A need is therefore arisen to provide a new design for solving the power supply problem of this type of unmanned aerial vehicles.

SUMMARY OF THE INVENTION

An object of this invention is to provide a solar cell module used for an unmanned aerial vehicle, where the solar cell module can provide sufficient electricity allowing the unmanned aerial vehicle to fly for a long period of time.

According to an embodiment of the present invention, a solar cell module is provided to be used for an unmanned aerial vehicle and it comprises a carrier base and a solar cell unit. The carrier base is arranged on the unmanned aerial vehicle. The solar cell unit comprises a plurality of solar cells attached to the carrier base. A ratio of a power totally supplied by the solar cell unit (P) to a weight of the solar cell module (Wg) is equal to or greater than 0.1 (W/g).

In an embodiment of this invention, an air flow generated by rotary blades of the unmanned aerial vehicle is substantially perpendicular to a top surface of each of the solar cells.

In an embodiment of this invention, a ratio of a weight of the unmanned aerial vehicle (Wt) to the weight of the solar cell module (Wg) is equal to or greater than 1.5 (Wt/Wg).

In an embodiment of this invention, a ratio of the power totally supplied by the solar cell module (P) to a total surface area of the solar cells (A) is equal to or greater than 50 (W/m$^2$).

In an embodiment of this invention, a ratio of a total surface area of the solar cells (A) and the weight of the solar cell module (Wg) is equal to or greater than 7 (cm$^2$/g).

In an embodiment of this invention, the unmanned aerial vehicle comprises a plurality of shafts with rotor blades revolve around each shaft, and a torque of each rotor blade is equal to or greater than 0.5 times a torque of the gravity in the corresponding direction.

In an embodiment of this invention, a tilt angle is between a horizontal plane and each of the solar cells for reducing an air resistance, and the tilt angle is adjustable.

DETAILED DESCRIPTION OF THE PREFERRED EMBODIMENT

Figure 1:
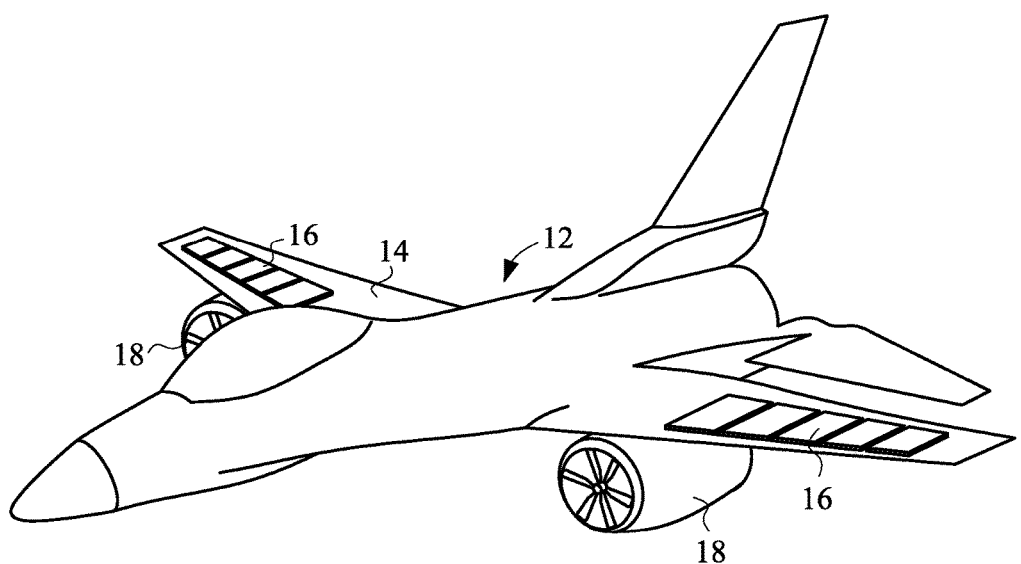
FIG. 1 is a perspective view showing a conventional fixed-wing type of unmanned aerial vehicle.

Embodiments of the invention are now described and illustrated in the accompanying drawings, instances of which are to be interpreted to be to scale in some implementations while in other implementations, for each instance, not. In certain aspects, use of like or the same reference designators in the drawings and description refers to the same, similar or analogous components and/or elements, while according to other implementations the same use should not. According to certain implementations, use of directional terms, such as, top, bottom, left, right, up, down, over, above, below, beneath, rear, front, clockwise, and counterclockwise, are to be construed literally, while in other implementations the same use should not. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not described in detail in order not to unnecessarily obscure the present invention. While drawings are illustrated in detail, it is appreciated that the quantity of the disclosed components may be greater or less than that disclosed, except where expressly restricting the amount of the components.

Figure 2A:
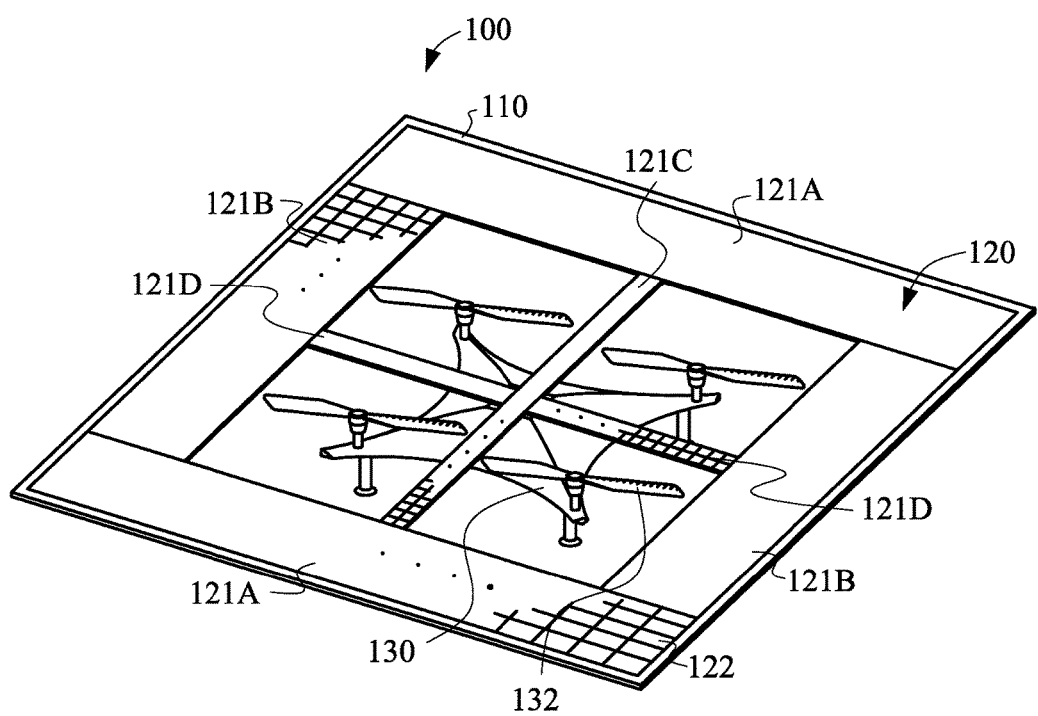
FIG. 2A is a front view showing an unmanned aerial vehicle with a solar cell module in accordance with a preferred embodiment of this invention.
Figure 2B:
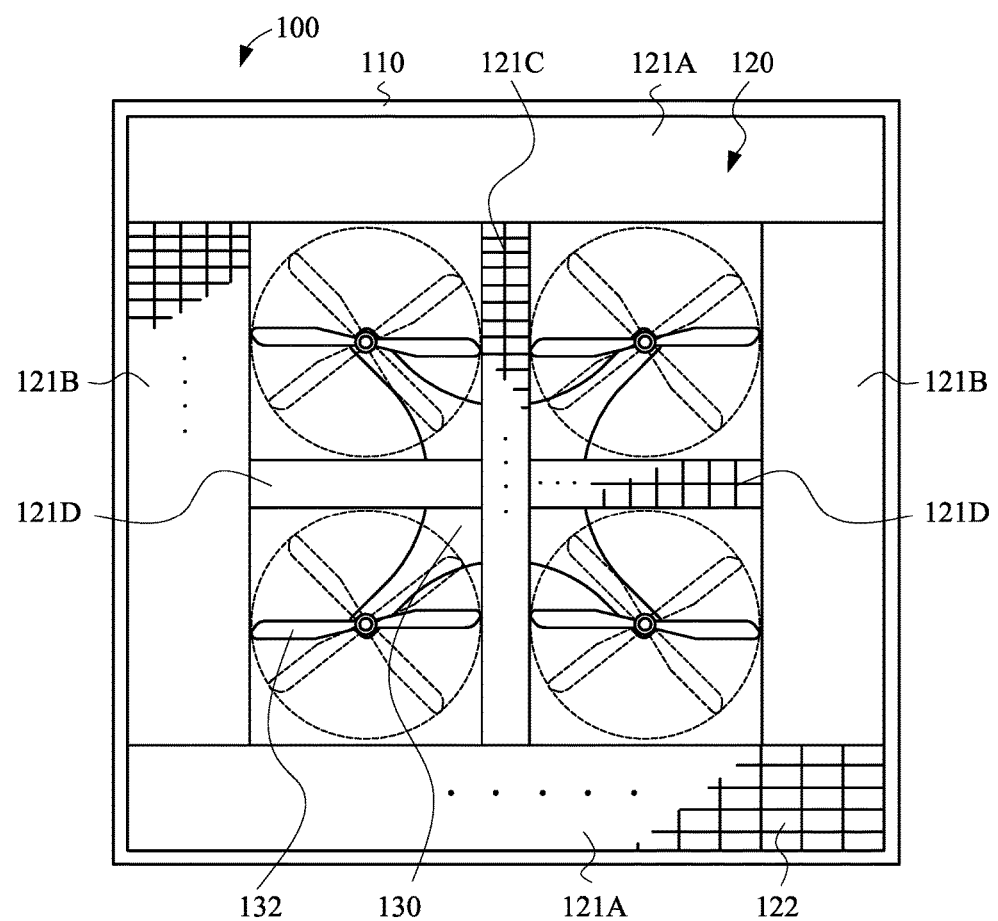
FIG. 2B is a top view showing the unmanned aerial vehicle with the solar cell module in accordance with the preferred embodiment of this invention.

FIGS. 2A and 2B are respectively front view and top view showing a solar cell module 100 used for an unmanned aerial vehicle 130 in accordance with a preferred embodiment of this invention. Referring to FIGS. 2A and 2B, the solar cell module 100 used for the unmanned aerial vehicle 130 comprises carrier base 110 and a solar cell unit 120. The carrier base 110 is arranged on the unmanned aerial vehicle 130. The solar cell unit includes a plurality of solar cells 122 attached to the carrier base 110. Wherein a ratio of the power (P) supplied by the solar cell unit 120 to the weight of the solar cell module 100 (Wg) is equal to or greater than 0.1 (W/g). By this ratio, the solar cell module 100 can possibly provide sufficient electricity to the unmanned aerial vehicle 130 under the normal sunlight intensity, i.e., about 1000 W/m$^2$.

In addition, the air flow generated by blades 132 of the unmanned aerial vehicle 130 is substantially perpendicular to the top surface of the solar cells 122. Further, in a preferred embodiment a ratio of the weight of the unmanned aerial vehicle 130 (Wt) to the weight of the solar cell module 100 (Wg) is equal to or greater than 1.5 (Wt/Wg). By this ratio, the solar cell module 100 will not be too heavy so that the unmanned aerial vehicle 130 is able to fly easily and the electricity provided by the solar cell module 100 will enable the unmanned aerial vehicle 130 flying for a long period of time.

Further, in another preferred embodiment a ratio of the total power supplied by the solar cell module 100 (P) to the total surface area of the total solar cells 122 (A) is equal to or greater than 50 (W/m$^2$). By this ratio, the electricity provided by the solar cell module 100 will possibly enable the unmanned aerial vehicle 130 flying for a long period of time.

Furthermore, a ratio (A/Wg) of the total surface area of the total solar cells (A) and the weight of the solar cell module 100 (Wg) is preferably equal to or greater than 7 (cm$^2$/g). By this ratio, the total weight of the solar cell module 100 and the unmanned aerial vehicle 130 will not be too heavy, so that the unmanned aerial vehicle 130 is able to easily fly and easily be controlled.

In particular, according to an embodiment of this invention the total surface area of the solar cell module 100 is less than 100 m$^2$. In particular, the total power supplied by the solar cell module (P) may have an upper and/or a lower limit. For example, according to an embodiment of this invention the total power supplied by the solar cell module (P) is at least greater than 1 W. According to another embodiment of this invention the total power supplied by the solar cell module (P) is less than 50 kW. In a particular embodiment of this invention, a ratio of the total power supplied by the solar cell module 100 (P) and the weight of the unmanned aerial vehicle 130 (Wt) is equal to or greater than 0.02 W/g under the normal sunlight intensity (about 1000 W/m$^2$). With this range limitation regarding surface area, power, and weight, the total weight of the unmanned aerial vehicle 130 combined with the solar cell module 100 will not be too heavy and the unmanned aerial vehicle 130 is able to easily fly and be controlled for a long period of time by electricity supplied from the solar cell module 100.

According to an embodiment of this invention, the unmanned aerial vehicle 130 includes a plurality of shafts, and rotor blades revolve around each shaft. In particular, a torque of each rotor blade (buoyancy multiplied by the length of the rotor blade) is equal to or greater than 0.5 times a torque due to the gravity in the corresponding direction. Accordingly, the torque of each rotor blade ensures that the unmanned aerial vehicle 130 can be recovered to balanced situation when it inclines during the flying.

Referring to FIG. 2B, the solar cells 122 of the solar cell unit 120 may be flexible according to the need of the product design. In addition, the solar cells 122 of the solar cell unit 120 may be foldable according to the need of the product design, so that the volume of the solar cell module 10 can be significantly reduced for convenient to store and/or carry after it is folded.

In addition, the solar cell unit 120 may include a plurality of sub-solar cell units 121. The sub-solar cell units 121 are connected in series or in parallel. In particular, when the sub-solar cell units 121 are connected in parallel, the total electric current of the sub-solar cell units 121 connected in parallel is equal to the input current required by the unmanned aerial vehicle 130. When the sub-solar cell units 121 are connected in series, the total voltage of the sub-solar cell units 121 connected in series is equal to the input voltage required by the unmanned aerial vehicle 130.

Referring to FIG. 2B, the solar cell unit 120 may include two first sub-solar cell units 121A, two second sub-solar cell units 121B, a third sub-solar cell unit 121C, and a forth sub-solar cell unit 121D. The two first sub-solar cell units 121A and the two second sub-solar cell units 121B constitute a rectangle or a square, and the third sub-solar cell unit 121C and the forth sub-solar cell unit 121D form a cross within the rectangle or square.

In addition, each of the first sub-solar cell units 121A, second sub-solar cell units 121B, third sub-solar cell unit 121C, and forth sub-solar cell unit 121D include a plurality of solar cells 122. For example, according to an embodiment of this invention the length and the width of each first sub-solar cell unit 121A are 12.5 cm and 7.8 cm, respectively, and the length and the width of each solar cell 122 are 2.5 cm and 1.2 cm, respectively. Therefore there are 65 solar cells 122 can be arranged within each first sub-solar cell unit 121A. The current or voltage generated by the solar cells 122 of the first sub-solar cell units 121A, the second sub-solar cell units 121B, the third sub-solar cell units 121C, and the forth sub-solar cell units 121D can be connected in series or in parallel, and the current or voltage connected in series or in parallel can be used as input current or voltage of the unmanned aerial vehicle 130.

According to another embodiment of this invention, each sub-solar cell unit 121 includes one or more power connectors (not shown) for electrically connecting with other sub-solar cell units 121. Accordingly, each sub-solar cell unit 121 is detachable and replaceable when the arrangement and/or the power input of the unmanned aerial vehicle 130 is needed to be varied or adjusted. The adjustment is convenient without to replace the whole solar cell module 100.

Figure 2C:
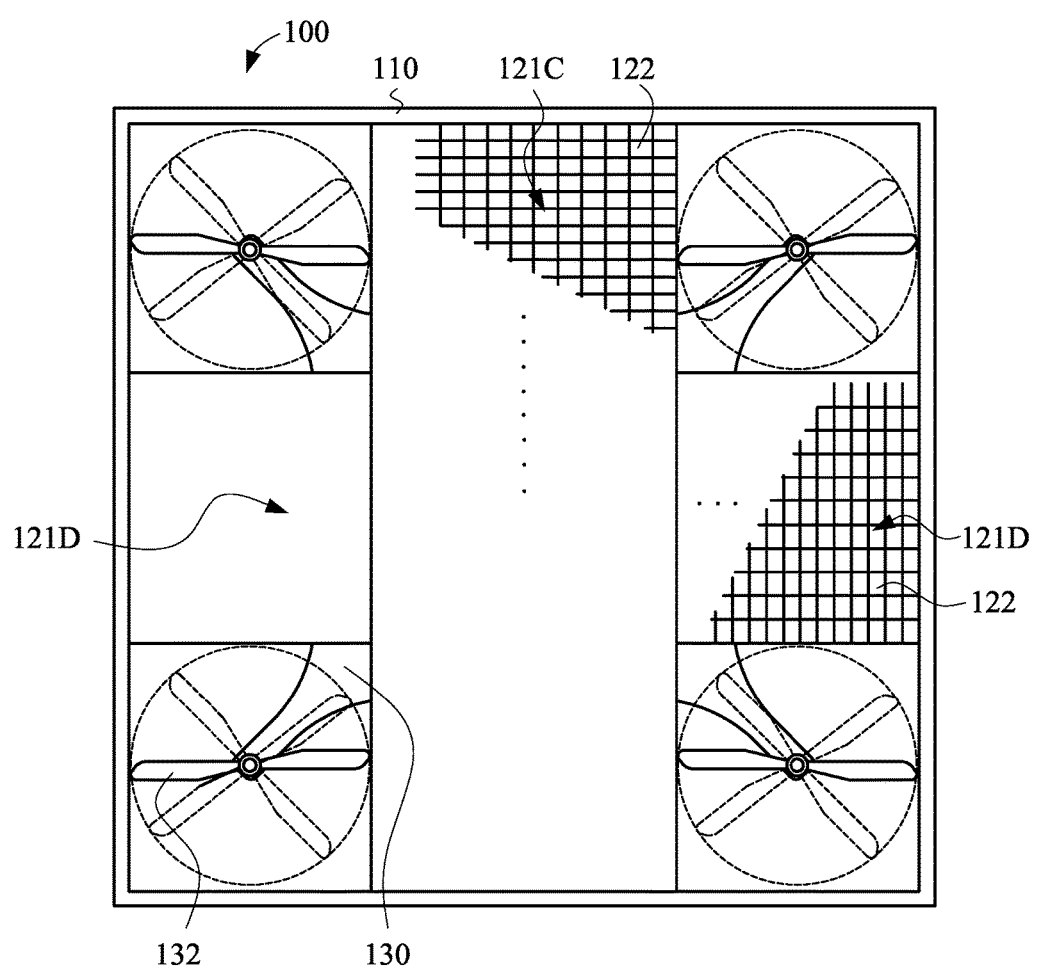
FIG. 2C is a top view showing an unmanned aerial vehicle with a solar cell module in accordance another embodiment of this invention.

FIG. 2C is a top view showing an unmanned aerial vehicle with a solar cell module in accordance another embodiment of this invention. Referring to FIG. 2C, the position and the arrangement of solar cell unit 120 are adjusted. Referring to FIG. 2C, merely the third sub-solar cell unit 121C and the forth sub-solar cell unit 121D are utilized. Referring to FIG. 2C, the third sub-solar cell unit 121C and the forth sub-solar cell unit 121D are arranged on the unmanned aerial vehicle 130. The unmanned aerial vehicle 130 includes four shafts and rotor blades 132 revolve around each shaft. The third sub-solar cell unit 121C and the forth sub-solar cell unit 121D form a cross and the four rotor blades 132 are separated by the cross.

Notice should be made that the solar cells 122 of the solar cell unit 120 and the rotor blades 132 of the unmanned aerial vehicle 130 may have the same elevation, but this is not limited. In another embodiment of this invention, the elevation of the solar cell unit 120 may be higher than the elevation of the rotor blades 132, so that a portion of the rotor blades 132 are covered by the solar cells 122 of the solar cell unit 120. In an embodiment of this invention, the portion of each rotor blade 132 covered by the solar cells 122 is less than 20% of a circle area that is generated by revolving the rotor blade 132. Referring to FIG. 2B, the four rotor blades 132 are arranged near the center. By contrast, the four rotor blades 132 are arranged at the corners of the carrier base 110 as shown in FIG. 2C. However, in another embodiment of this invention the four rotor blades 132 may be arranged at other positions such as positions between the center and the corners, and the remaining positions are used to place the solar cells 122 of the solar cell unit 120.

Figure 2D:
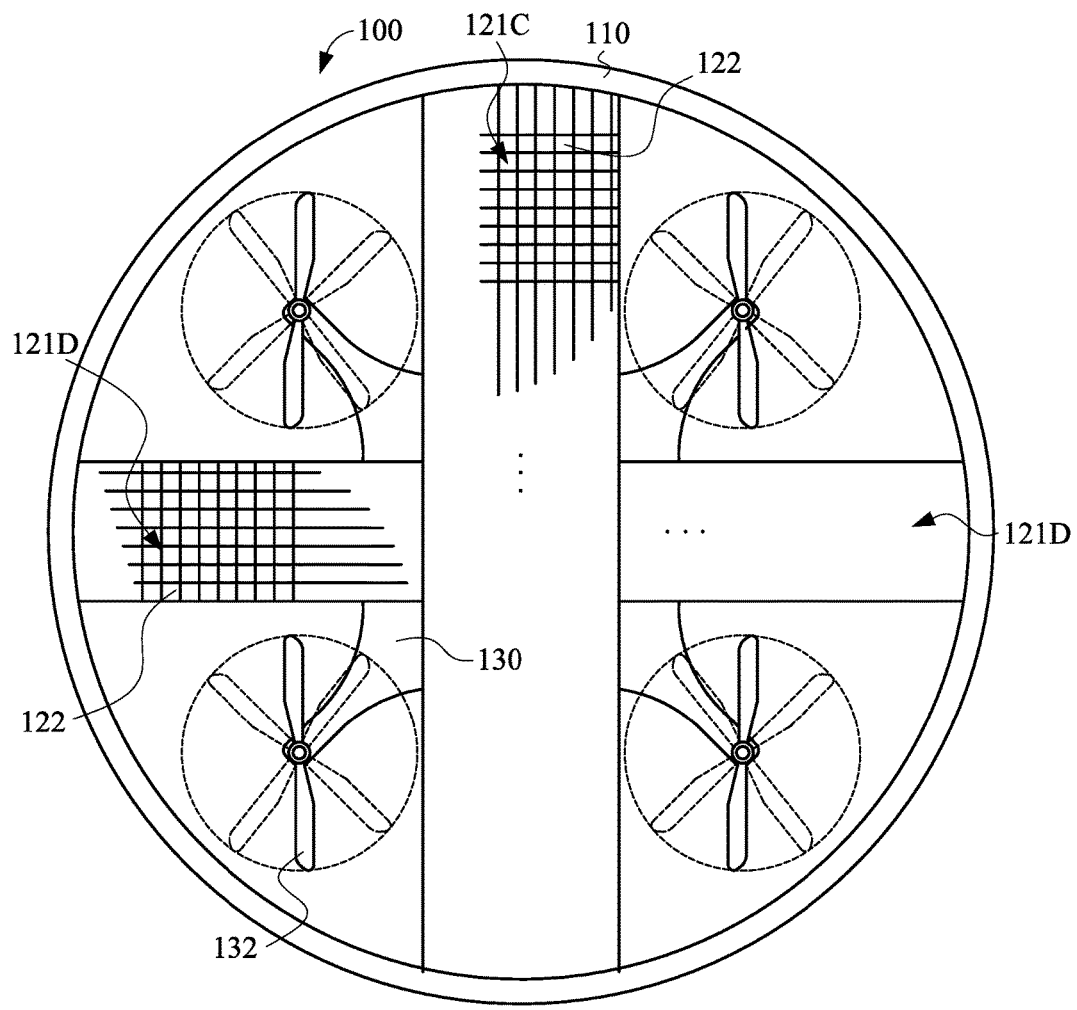
FIG. 2D is a top view showing an unmanned aerial vehicle with a solar cell module in accordance another embodiment of this invention.

FIG. 2D is a top view showing an unmanned aerial vehicle with a solar cell module in accordance another embodiment of this invention. Referring to FIG. 2D, the carrier base 110 of the solar cell module 100 may have a round configuration so as to reduce the turbulence of the unmanned aerial vehicle during the flying. In other embodiments of this invention, the carrier base 110 may have polygonal or other streamline configurations, and some solar cells 122 of the solar cell module 100 may be cut to fit the outline of the carrier base 110.

Figure 2E:
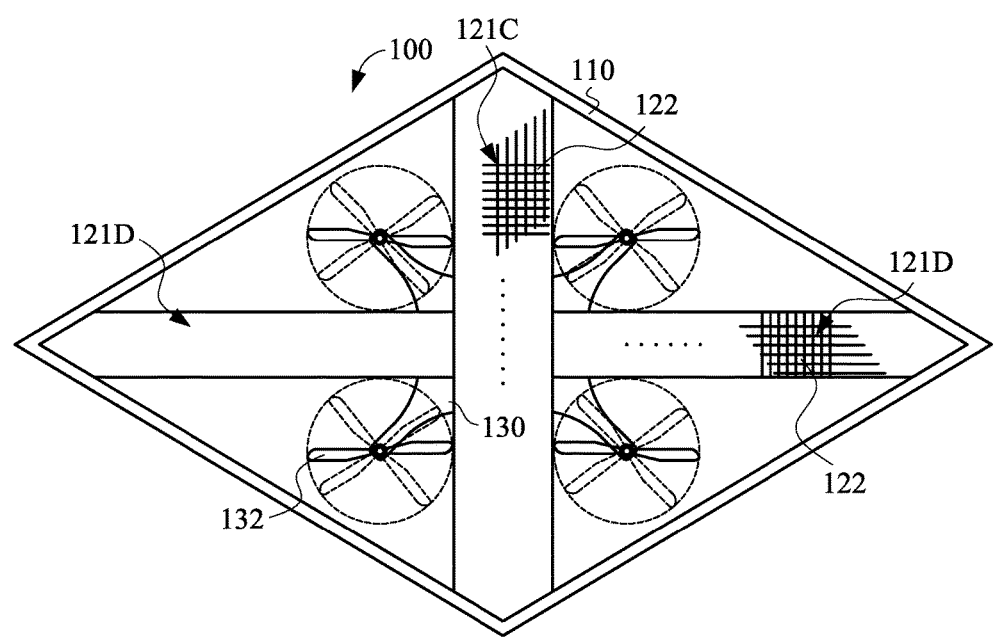
FIG. 2E is a top view showing an unmanned aerial vehicle with a solar cell module in accordance another embodiment of this invention.

FIG. 2E is a top view showing an unmanned aerial vehicle with a solar cell module in accordance another embodiment of this invention. Referring to FIG. 2E, the torque of each rotor blade (buoyancy multiplied by the length of the rotor blade) is equal to or greater than 0.5 times a torque of the gravity in the corresponding direction to ensure that the unmanned aerial vehicle 130 can be recovered when it inclines during the flying. As shown in FIG. 2C, the rotary blades 132 can be arranged at corners of the carrier base 110 of the unmanned aerial vehicle 130. As shown in FIG. 2E, instead of being arranged at corners, the third sub-solar cell unit 121C and the forth sub-solar cell unit 121D are arranged at the vertical and horizontal diagonal line of the carrier base 110, respectively, and the four rotor blades 132 are arranged near the center of the carrier base 110 but are separated by the third sub-solar cell unit 121C and the forth sub-solar cell unit 121D. This arrangement has an advantage that the unmanned aerial vehicle 130 can be easily recovered when it inclines during the flying. For example, the right corner is farthest position from the center of the carrier base 110, and if the right corner inclines during the flying, it will result in a biggest torque (force multiplied by a length between the center and the right corner of the carrier base 110). However, the right corner is between two rotor blades 132, and the two rotor blades 132 will provide a combined force sufficient to draw and balance the right corner.

Figure 3:
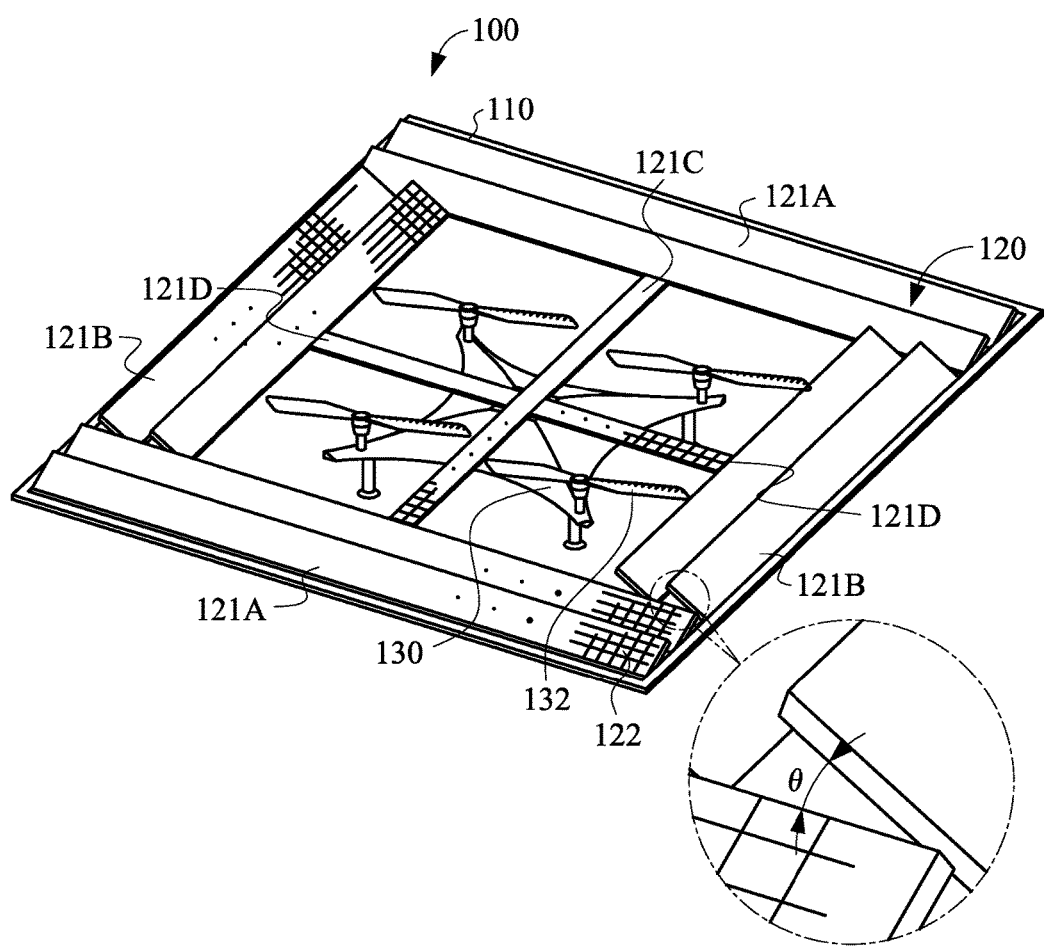
FIG. 3 is a front view showing an unmanned aerial vehicle with a solar cell module in accordance with another embodiment of this invention.

FIG. 3 is a front view showing an unmanned aerial vehicle with a solar cell module in accordance with another embodiment of this invention. Referring to FIG. 3, the solar cells 122 may have a tilt angle instead of being horizontally paved as shown in the above-mentioned embodiments. Referring to FIG. 3, a tilt angle θ is between a horizontal plane and each of the solar cells 122 of the first sub-solar cell unit 121A and the second sub-solar cell unit 121B. This design ensures that the solar cell module 100 can absorb enough sunlight and has air resistance smaller than that of being horizontally paved. In an embodiment of this invention, the tilt angle θ is fixed between 0 and 45 degrees. According to another embodiment of this invention, the tilt angle θ is adjustable. In particular, when the unmanned aerial vehicle 130 is ready to be lifted off, the tilt angle θ is adjusted to be big, e.g., 90 degrees or approximately 90 degrees, and when the unmanned aerial vehicle 130 fly across the sky with a necessary elevation, the tilt angle θ is adjusted to be small, e.g., 0 or approximately 0 degree. Notice should be made in this embodiment the solar cells with tilt angle are applied to solar cell module 100 of FIG. 2A; however, the solar cells 122 with a tilt angle can also be used for other embodiments of this invention.

Figure 4:
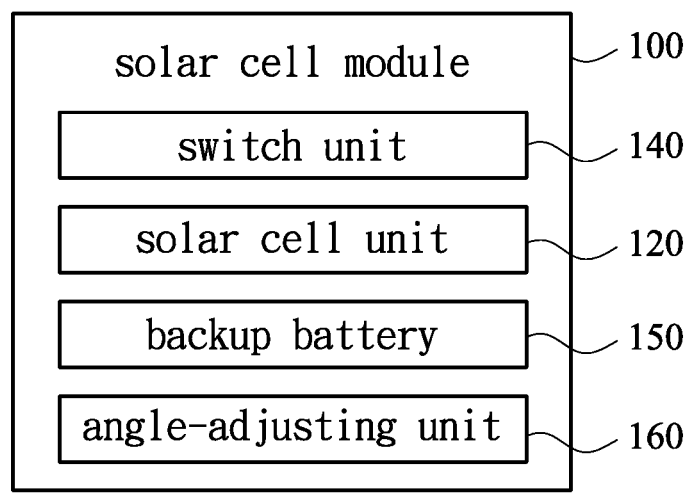
FIG. 4 is a block diagram showing a solar cell module of an unmanned aerial vehicle in accordance with a preferred embodiment of this invention.

FIG. 4 is a block diagram showing a solar cell module of an unmanned aerial vehicle in accordance with a preferred embodiment of this invention. Referring to FIG. 4, the solar cell module 100 may further include a switching unit 140 and a backup battery 150. When the electricity provided to the unmanned aerial vehicle 130 is insufficient or the sunlight intensity is weak, the switching unit 140 is operated to electrically couple the unmanned aerial vehicle with the backup battery 150, so that the backup battery 150 can provide electricity to keep the unmanned aerial vehicle 130 flying. In addition, when the electricity provided to the unmanned aerial vehicle 130 is sufficient or the sunlight intensity is strong, a portion of the electricity generated by the solar cell unit 120 can be stored in the backup battery 150.

Referring to FIG. 4, the solar cell module 100 may further include an angle-adjusting unit 160 to adjust the tilt angle θ of the solar cells 122. In an embodiment of this invention, the adjustment of the tilt angle θ may be according to the incident angle of the sunlight, so that the solar cells 122 can absorb more sunlight and hence generate more electricity.

Referring to FIG. 4, according to an embodiment of this invention the adjustment of the tilt angle θ depends on the situations of the unmanned aerial vehicle 130, so as to reduce the air resistance during the operation or flying. For example, when the unmanned aerial vehicle 130 is ready to be lifted off, the angle-adjusting unit 160 adjusts the tilt angle θ to be big, e.g., 90 degrees or approximately 90 degrees, and when the unmanned aerial vehicle 130 flies across the sky with a necessary elevation, the angle-adjusting unit 160 adjusts the tilt angle θ to be small, e.g., 0 or approximately 0 degree. By this design, the air resistance for the unmanned aerial vehicle 130 can be reduced and the solar cell module 100 can provide sufficient electricity to the unmanned aerial vehicle 130 for flying a long period of time. In an embodiment of this invention, the adjustment of the tilt angle of solar panels can be achieved with an on-board microprocessor for an automatic decision for the optimal angle.

The intent accompanying this disclosure is to have each/all embodiments construed in conjunction with the knowledge of one skilled in the art to cover all modifications, variations, combinations, permutations, omissions, substitutions, alternatives, and equivalents of the embodiments, to the extent not mutually exclusive, as may fall within the spirit and scope of the invention. Corresponding or related structure and methods disclosed or referenced herein, and/or in any and all co-pending, abandoned or patented application(s) by any of the named inventor(s) or assignee(s) of this application and invention, are incorporated herein by reference in their entireties, wherein such incorporation includes corresponding or related structure (and modifications thereof) which may be, in whole or in part, (i) operable and/or constructed with, (ii) modified by one skilled in the art to be operable and/or constructed with, and/or (iii) implemented/made/used with or in combination with, any part(s) of the present invention according to this disclosure, that of the application and references cited therein, and the knowledge and judgment of one skilled in the art.

Conditional language, such as, among others, "can," "could," "might," or "may," unless specifically stated otherwise, or otherwise understood within the context as used, is generally intended to convey that embodiments include, and in other interpretations do not include, certain features, elements and/or steps. Thus, such conditional language is not generally intended to imply that features, elements and/or steps are in any way required for one or more embodiments, or interpretations thereof, or that one or more embodiments necessarily include logic for deciding, with or without user input or prompting, whether these features, elements and/or steps are included or are to be performed in any particular embodiment.

All of the contents of the preceding documents are incorporated herein by reference in their entireties. Although the disclosure herein refers to certain illustrated embodiments, it is to be understood that these embodiments have been presented by way of example rather than limitation. For example, any of the particulars or features set out or referenced herein, or other features, including method steps and techniques, may be used with any other structure(s) and process described or referenced herein, in whole or in part, in any combination or permutation as a non-equivalent, separate, non-interchangeable aspect of this invention. Corresponding or related structure and methods specifically contemplated and disclosed herein as part of this invention, to the extent not mutually inconsistent as will be apparent from the context, this specification, and the knowledge of one skilled in the art, including, modifications thereto, which may be, in whole or in part, (i) operable and/or constructed with, (ii) modified by one skilled in the art to be operable and/or constructed with, and/or (iii) implemented/made/used with or in combination with, any parts of the present invention according to this disclosure, include: (I) any one or more parts of the above disclosed or referenced structure and methods and/or (II) subject matter of any one or more of the inventive concepts set forth herein and parts thereof, in any permutation and/or combination, include the subject matter of any one or more of the mentioned features and aspects, in any permutation and/or combination.

Although specific embodiments have been illustrated and described, it will be appreciated by those skilled in the art that various modifications may be made without departing from the scope of the present invention, which is intended to be limited solely by the appended claims.

What is claimed is:

1. A solar cell module used for a rotorcraft unmanned aerial vehicle capable of taking off and landing vertically, comprising:
a carrier base being arranged on the rotorcraft unmanned aerial vehicle;
a solar cell unit comprising a plurality of solar cells attached to the carrier base;
wherein a ratio of the power totally generated by the solar cell unit (P) to the weight of the solar cell module (Wg) is equal to or greater than 0.1 (W/g), and wherein the weight of the solar cell module (Wg) is the weight of the carrier base plus the weight of the solar cell unit.

2. The solar cell module as recited in claim 1, wherein an air flow generated by rotary blades of the rotorcraft unmanned aerial vehicle is substantially perpendicular to a top surface of each of the solar cells.

3. The solar cell module as recited in claim 1, wherein a ratio of a weight of the rotorcraft unmanned aerial vehicle (Wt) to the weight of the solar cell module (Wg) is equal to or greater than 1.5 (Wt/Wg).

4. The solar cell module as recited in claim 1, wherein a ratio of the power totally supplied by the solar cell module (P) to a total surface area of the solar cells (A) is equal to or greater than 50 (W/m$^2$).

5. The solar cell module as recited in claim 1, wherein a ratio of a total surface area of the solar cells (A) and the weight of the solar cell module (Wg) is equal to or greater than 7 (cm$^2$/g).

6. The solar cell module as recited in claim 1, wherein the power totally supplied by the solar cell module (P) is at least greater than 1 W.

7. The solar cell module as recited in claim 1, wherein the power totally supplied by the solar cell module (P) is less than 50 kW.

8. The solar cell module as recited in claim 1, wherein the rotorcraft unmanned aerial vehicle comprises a plurality of shafts with rotor blades revolve around each shaft, and a torque of each rotor blade is equal to or greater than 0.5 times a torque of the gravity in the corresponding direction.

9. The solar cell module as recited in claim 1, wherein the solar cells are flexible.

10. The solar cell module as recited in claim 1, wherein the solar cells are foldable.

11. The solar cell module as recited in claim 1, wherein a ratio of the total power supplied by the solar cell module (P) and a weight of the rotorcraft unmanned aerial vehicle (Wt) is equal to or greater than 0.02 W/g.

12. The solar cell module as recited in claim 1, wherein a portion of a rotor blade of the rotorcraft unmanned aerial vehicle is covered by the solar cells of the solar cell unit, and the portion is less than 20% of a circle area generated by revolving the rotor blade.

13. The solar cell module as recited in claim 1, further comprising a switching unit and a backup battery, wherein when electricity provided to the rotorcraft unmanned aerial vehicle is insufficient, the switching unit is operated to electrically couple the rotorcraft unmanned aerial vehicle with the backup battery, so that the backup battery can provide electricity to keep the rotorcraft unmanned aerial vehicle flying.

14. The solar cell module as recited in claim 13, wherein when electricity provided to the rotorcraft unmanned aerial vehicle is sufficient, a portion of the electricity generated by the solar cell unit is stored in the backup battery.

15. The solar cell module as recited in claim 1, wherein a total surface area of the solar cells of the solar cell module is less than 100 m².

16. The solar cell module as recited in claim 1, wherein the solar cell unit comprising a plurality of sub-solar cell units, and the sub-solar cell units are connected in series or in parallel.

17. The solar cell module as recited in claim 16, wherein each sub-solar cell unit comprises one or more power connectors for electrically connecting with other sub-solar cell units.

18. The solar cell module as recited in claim 1, wherein a tilt angle is between a horizontal plane and each of the solar cells for reducing an air resistance.

19. The solar cell module as recited in claim 18, wherein the tilt angle is fixed at an angle between 0 and 45 degrees.

20. The solar cell module as recited in claim 18, wherein the tilt angle is adjustable, and when the rotorcraft unmanned aerial vehicle is ready to be lifted off, the tilt angle is adjusted to be 90 degrees or approximately 90 degrees, and when the rotorcraft unmanned aerial vehicle flies across the sky with a necessary elevation, the tilt angle is adjusted to be 0 or approximately 0 degree.

21. The solar cell module as recited in claim 18, further comprising an angle-adjusting unit to adjust the tilt angle according to an incident angle of sunlight or a situation of the rotorcraft unmanned aerial vehicle.

* * * * *